United States Patent [19]

Dighe et al.

[11] Patent Number: 5,448,567
[45] Date of Patent: Sep. 5, 1995

[54] CONTROL ARCHITECTURE FOR ATM NETWORKS

[75] Inventors: Rajiv Dighe, Princeton Junction; Alexander T. Ishii, Princeton; Gopalakrishnan Ramamurthy, Cranbury, all of N.J.

[73] Assignee: NEC Research Institute, Inc.

[21] Appl. No.: 97,683

[22] Filed: Jul. 27, 1993

[51] Int. Cl.⁶ .................................................. H04J 3/24
[52] U.S. Cl. ...................................... 370/94.2; 370/84
[58] Field of Search .......................... 370/94.2, 94.1, 60, 370/60.1, 17, 13, 84, 95.1, 82, 83; 377/44

[56] References Cited

U.S. PATENT DOCUMENTS

| | | | |
|---|---|---|---|
| 5,179,556 | 1/1993 | Turner | 370/94.1 |
| 5,280,470 | 1/1994 | Buhrke et al. | 370/17 |
| 5,295,135 | 3/1994 | Kammerl | 370/17 |
| 5,297,139 | 3/1994 | Okura et al. | 370/94.2 |
| 5,313,454 | 5/1994 | Bustini et al. | 370/94.2 |

OTHER PUBLICATIONS

Jose A. Suragy Monteiro et al, "Leaky Bucket Analysis for ATM Networks", 1990 IEEE, pp. 0498–0502.
H. Jonathan Chao, "Dewign of Leaky Bucket Access Control Schemes in ATM Networks", ICC'91, pp. 0180–0187.
Naoaki Yamanaka et al, "Performance Limitation of Leaky Bucket Algorithm for Usage Parameter Control and Bandwidth Allocation Methods", IEICE Trans. Commun. vol. E75-B No. 2 Feb. 1992.

*Primary Examiner*—Douglas W. Olms
*Assistant Examiner*—Dang Ton
*Attorney, Agent, or Firm*—Philip J. Feig

[57] ABSTRACT

A control method and architecture is described for an ATM network carrying connectionless data traffic. The method is capable of integrating connection-oriented as well as connectionless traffic. The method takes advantage of the quasi-deterministic nature of the traffic emanating from a source that is being shaped by the leaky bucket shaping algorithm. Alternative methods are provided if such a shaping algorithm is not provided by the CPE which methods still guarantee performance that equals or exceeds shared media networks such as FDDI. Hardware and software embodiments of the methods are disclosed. The invention is particularly applicable to LANs and hubs.

5 Claims, 11 Drawing Sheets

5,448,567

CONTROL ARCHITECTURE FOR ATM NETWORKS

BACKGROUND OF THE INVENTION

The present invention relates to a control architecture for asynchronous transfer mode (ATM) networks, and specifically relates to a burst-level control for controlling access in an ATM network.

While the following description describes the invention in conjunction with a LAN, the invention is not so limited and is applicable to any ATM network.

There is tremendous interest in the development of ATM based LANs that provide connectivity between local work-stations and servers and are also suitable for use as a hub.

Current LAN technologies have media access control which ensures that once a station gains access to the medium, no frame loss results (except due to random noise). Many ATM-based switch architectures, on the other hand, do not have such control. Moreover, because of the limited amount of high speed memory that is provided in a switch, it is possible for there to be significant cell loss, especially when there is hot spot traffic from several bursty sources all directed to a single output port. For example, such a condition occurs in a client server model. The resulting cell loss leads to large frame loss when compared to systems having media access control. Therefore, it is essential that during periods of overload the bandwidth at a hot-spot output port be shared in a manner similar to that in a shared medium network.

A solution to implementing media access control and shared bandwidth at a hot-spot output port is to institute a burst-level control that manages media access in an ATM LAN. Burst level control is preferable in an ATM LAN when the following conditions are met: sources generate large bursts (compared to the amount of buffer memory in the switch) that will result in buffer overflows in the absence of any control; blocking a burst at the beginning of the burst is preferable to having retransmissions of bursts already in progress and frequent retransmissions due to cell loss increases the effective load on the system, resulting in an end-to-end throughput that is several times slower than that of a shared medium network.

However, it is important that the burst level control be done in real time so that the latencies in admitting new bursts do not become a significant bottleneck.

The present invention describes a burst level control method and apparatus for use in an ATM LAN. The burst level provides both a media access control and a fast and efficient call admission control.

By using such a burst level control, not only can ATM LAN performance be comparable to the performance of media access based technologies, e.g., FDDI, with respect to hot spot traffic, but the ATM LAN is able to provide a total bandwidth that is N times the bandwidth of a shared media system (where N is the number of ports). Moreover, the burst level control is scalable to wide area networks because the control does not rely on reactive mechanisms as a primary method of congestion control and is a small add-on function that is useful for Public Networks.

SUMMARY OF THE INVENTION

In accordance with the teachings of the present invention, it is assumed that the source and the network have usage parameter control (UPC) parameter negotiation. The present invention provides a burst-level control scheme based upon UPC parameters. Specifically, a new cell transmission accept/reject methodology is used to modify individual bursts, Novel circuitry detects the presence of a new burst.

A principal object of the present invention therefore, is the provision of burst level control in an ATM network.

Another object of the present invention is the provision of an accept/reject method for modifying a burst.

A further object of the present invention is a circuit for detecting the presence of a new burst.

Further and still other objects of the present invention will become more clearly apparent when the following description is read in conjunction with the accompanying drawings.

DETAILED DESCRIPTION OF THE INVENTION

Figure 1:
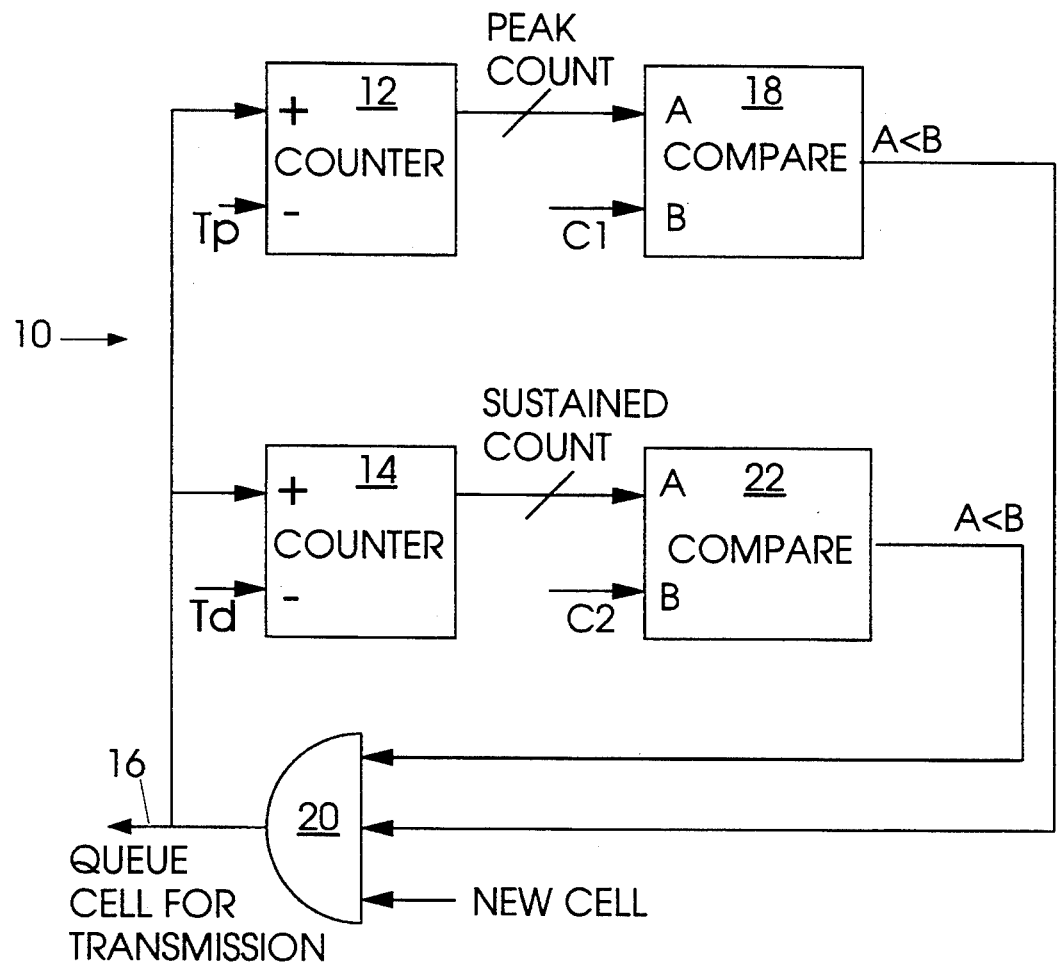
FIG. 1 is schematic representation of a prior art leaky bucket shaper circuit.

Referring now to the figures and to FIG. 1 in particular, there is shown schematically a prior art dual leaky bucket shaper circuit. Leaky bucket algorithms and their application to ATM networks are described in articles such as "Leaky Bucket Analysis for ATM Networks" by J. Monteiro et al, and "Performance Limitation of Leaky Bucket Algorithm for Usage Parameter Control and Bandwidth Allocation Methods" by N. Yamanaka et al in IEICE Trans. Commun., Vol 75-B No. 2, Feb. 1992.

Customer premises equipment (CPE) is assumed to implement a dual leaky bucket of the kind shown in FIG. 1 based shaping mechanism on a per VC (Virtual Channel) basis. Shaping refers to the changing of the spacing of the cells comprising the burst or packet of information or data. In order to assure proper operation, a switch (not shown) must implement the same criteria as the CPE for policing mechanism. When both the switch and the CPE implement the same criteria, the two act in the manner of a set of matched filters thereby potentially saving signalling bandwidth and latency time. The described arrangement has limitations for initial deployment so it will be assumed that signalling will be from the switch to the CPE.

The dual leaky bucket shaping circuit 10 comprises a pair of counters 12 and 14. Counter 12 controls the peak rate $\lambda_p$ at which the source is permitted to send bursts. The size of counter 12 is $C_1$. For simplicity, the counter 12 is assumed to be a one bit counter. Counter 14 controls a parameter referred to as the sustained rate $\lambda_D$ to be described hereinafter. The size of counter 14 is $C_2$.

The operation of the dual leaky bucket shaping circuit 10 is rule-based and shapes the user traffic as described in the following manner. A cell is transmitted along conductor 16 if the current value of counter 12 is one less than $C_1$ and the current value of counter 14 is one less than $C_2$. Otherwise, the cell is held back either in the interface card or a CPU comprising a portion of the traffic source, until the conditions are satisfied. When both of the conditions are met, the cell is transmitted, and both of the counters are incremented by one. The counter 12 is continuously decremented at a constant rate equal to the peak rate $\lambda_p$ by virtue of an input signal $T_p$. Similarly, the counter 14 is continuously decremented at a constant rate $\lambda_D$ by virtue of an input signal $T_d$. The minimum value of the counters is ZERO. Hence, if only the counter 12 is full ($C_1$) when a cell arrives, the cell is delayed at most for a period $\lambda_p^{-1}$ or $T_p$, before being transmitted.

The output of counter 12 is provided as a first input to comparator 18. The size of counter 12 is provided as a second input to comparator 18. As described above, when the output of counter 12 is less than the size of counter 12 a signal is manifest from comparator 18 as a first input to AND gate 20.

The output of counter 14 is provided as a first input of comparator 22. The size of counter 14 is provided as a second input to comparator 22. As described above, when the output of counter 14 is less than the size of counter 14 a signal is manifest from comparator 22 as a second input to AND gate 20.

New cells are provided as third input signals to AND gate 20. When all three inputs to AND gate 20 are present simultaneously, the cell is manifest at conductor 16 for transmission. The output of AND circuit 20 is also provided as a respective input to counter 12 and to counter 14.

For given set of leaky bucket parameters ($\lambda_p$, $\lambda_D$, $C_1 = 1$, $C_2$), there is a Maximum Compliant Burst Size, $B_{Max}$, given by the equation:

$$B_{Max} = \frac{(C_2 - 1)}{\left(1 - \frac{\lambda_D}{\lambda_P}\right)} + 1.$$

Figure 2A:
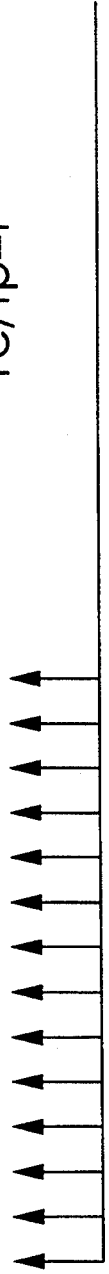
FIG. 2a is a graphical representation of an input burst of new cells to the leaky bucket shaper circuit.
Figure 2B:
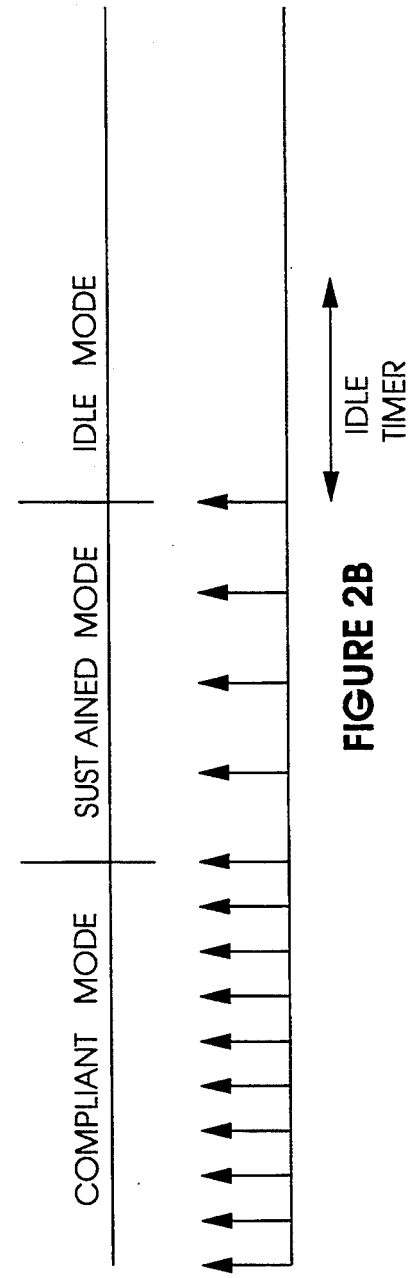
FIG. 2b is a schematic representation of an output of the leaky bucket shaper circuit of FIG. 1.

When the source sends a burst of B cells greater than $B_{Max}$, at the peak rate $\lambda_p$ as shown if FIG. 2a. The traffic pattern at the output of the leaky bucket shaper circuit is shown in FIG. 2b. There are three modes of operation represented in FIG. 2b.

In a compliant mode, the leaky bucket shaper circuit output comprises at most $B_{Max}$ cells at the peak rate $\lambda_p$. In a sustained mode, the leaky bucket shaper circuit output comprises the remaining $B - B_{Max}$ cells at the sustained rate $\lambda_D$. After the sustained mode the VC becomes idle, in an idle mode.

A method for detecting the beginning and end of each mode and a method for using the detected information form the basis of the control comprising the present invention.

In order to understand the invention, assume there are N VCs connected to a given output port and that it is possible to detect the beginning and end of each burst. Further assume that L of the VCs are active at a particular time. The remaining (N-L) VCs are declared inactive and their resources are deallocated. If a new $VC_{L+1}$ becomes active with parameters $\lambda_p^{L+1}$, $\lambda_D^{L+1}$, $B_{Max}^{L+1}$, whether the burst is accepted or rejected depends upon how conservative or optimistic the accept/reject decision criteria is made.

In a conservative approach all L active VCs are assumed to be in the compliant M Mode. That is, each active VC is in the process of generating their maximum burst at their respective peak rate. A new burst is accepted on the premise that there are $B_Q$ buffers and the output port speed is $\lambda_C$, then the new burst is accepted only if no cell loss will result. The approach is conservative because in practical situations not all VCs are likely to be in the compliant mode.

In an optimistic approach all L active VCs are assumed to be in the sustained mode. In this case, a new burst is accepted when $$\lambda_D^{L+1} + \sum_{i=L}^{i=1} \lambda_D^i < \lambda_C.$$

This approach is too optimistic since in practical situations at least some of the VCs are in the compliant mode. Therefore, accepting a new burst under the optimistic approach may result in cell loss.

In a more practical approach, use is made of knowledge regarding the quantity of active VCs that are in the compliant mode, and the quantity of VCs that are in the sustained mode or are being timed out, to make an acceptance decision. An implementation of this approach is described below.

The basic principle of the present invention results in using the traffic shaping performed by the dual leaky bucket shaper circuit.

For the purposes of describing connectionless service it will be assumed that the local ATM LAN can be divided into two domains, i.e., the CPE domain and the switch domain. The CPE comprises a workstation, the applications in the workstation that need the transport provided by the switch, the transport protocols and the interface to the switch. The CPE can also be a router or an access node. In this case, the ATM LAN could be viewed as a hub. Current data applications use a connection-less mode for transport of information. The ATM LAN which is inherently based on connection oriented transport, will provide connection-less service based on fast VC setup provided that there is a signalling scheme that can: request new VCs to be setup and existing VCs to be disconnected; detect activity levels on a given VC; request existing VCs be either deactivated or activated based on the activity level of the VC; and associate a unique VC with a given application. It is assumed that the application uses the socket feature of the UNIX OS for communication. In this case, at the time of a fast VC setup, the CPE must be able to associate the new VC with the socket port number used by the application. This may require either a new implementation of the Transport protocols, or a violation of the protocol layering function. The Service Access Point (SAP) may be one way of accomplishing this result.

If each ATM LAN switch has a maximum of N=16 ports that are switched using a single stage switch, then, between any given input-output port there is only one path. When large switches are required, many 16 port switches are interconnected. In the latter case there can be more than one path from the input port of one switch to the output port of another switch. First consider the control of a single switch only. Assume that both the CPE interface and the switch interface have a dual leaky bucket shaper circuits for shaping and policing respectively.

Figure 11:
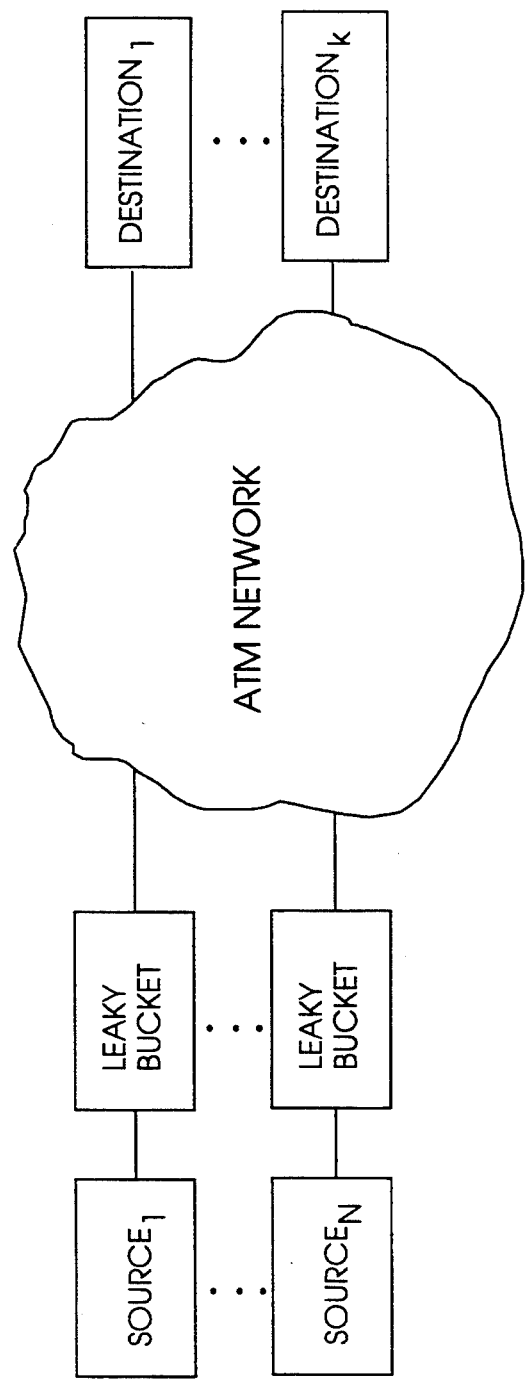
FIG. 11 is a schematic diagram of a traffic control architecture in an ATM network.

Referring generally to FIG. 11, using a single stage switch and N ports, between any given input port and a given output port there is only one possible path. Associated with each port (input or output), there are a set of K VCs. For example, input port $i(i=1, \ldots, N)$, has a set of K VCs numbered as $V_{ik}^{IN}$ (k =1, 2, . . . , K). Similarly, there are K VCs numbered as $V_{jk}^{OUT}$ (k=1, 2, . . . , K). A fast call setup between a source $S_i$ physically connected to input port i of the switch, and a destination $D_j$ that is physically connected to output port j of the switch, now comprises identifying an appropriate free VC $V_{ik}^{IN}$ (k =1, 2, . . . , K) on input port i and an appropriate free VC $V_{jk}^{OUT}$ (k=1, 2, . . . , K) at output port j. If the necessary resources are available on this path the connection setup proceeds ahead. Next, an association must be made between chosen incoming VC $V_{ik}^{IN}$ at input port i of the switch, and the outgoing VC $V_{jk}^{OUT}$ at output port j. When such a setup is done, the required resources on this path are reserved for this connection, and the shaping devices on the CPE and the monitoring devices on the switch are informed accordingly.

Tear-down of connections involves disassociation-association of the incoming and outgoing VCs. When such a tear-down occurs, the resources allocated to the connection are also deallocated. The resources of interest are the output port transmission bandwidth and the output port buffers. The VCs are now free.

In addition to facilitating fast setup and tear down of connections (or VCs), the switch and the CPE should also monitor the activity level of VCs and declare an ACTIVE VC as IDLE. In this case, instead of tearing down down the connection at the end of every burst, the corresponding VC is to declared as IDLE, and the resources are deallocated but the VC is marked as BUSY. When activity is again detected on this connection, the resources are restored to this connection and the connection is declared as ACTIVE. This requires the capability to detect the beginning of new bursts and the end of current bursts. In accordance with the present invention hardware based timeout will actually be used to declare the VC IDLE. Detection of ACTIVE-IDLE states increases the, resource utilization (and thereby reduces blocking), and also reduces the load on the call processor. That is, call setups (and tear downs) are not performed at the beginning (and end) of each burst.

Every time a new connection is opened by an application, a fast call setup will be performed and the appropriate VCs will be set. The necessary resources will be allocated and the leaky bucket parameters will be updated. A state machine is maintained for each VC which can be ACTIVE or IDLE. When the connection becomes IDLE (determined by timing out the idle period after the end of a burst), the resources are deallocated and the state of the VC is marked IDLE. When the connection becomes active again (by detecting the beginning of a new burst while in the IDLE state), the necessary resources are reallocated.

There are several issues that have to be addressed with this fast VC setup and burst-level control procedure. When a request for new connection setup is made and the resources are not available on the path, alternatives are available. For example, in response to the request it is possible to send a NACK signal (indicating that the VC is not available) and ask the CPE to retry after a back-off interval. Alternatively, the request may be passed to a queue that is common to all the paths that have the same output port. This queue will be referred to as the Resource Request Queue (RRQ). If the wait time in the queue exceeds a predetermined time $T_W$, then the request is removed from the queue and a NACK is sent to the CPE, and the CPE must retry after a back-off interval. The resource allocation scheme is dispersed in such a way that the probability of sending a NACK in this case, as well as the maximum wait time $T_W$ are both very low. The advantage of this method is that signalling traffic is reduced.

As a further alternative, it is possible to offer a bandwidth that is less than the requested bandwidth (if it is available), and inform the CPE of the modified traffic parameters. If no resources are available, then the request is queued in the RRQ. A key issue is the latency involved in making these decisions and communicating them.

The described burst-level control can significantly increase the utilization of available bandwidth. A high utilization is achieved by trading cell or frame loss with burst level blocking, for example, to achieve a burst level blocking of $10^{-3}$ with a cell loss probability of $10^{-6}$.

The burst level control requires detecting the activity of the VC and declaring it as being either ACTIVE (resources are committed in this state) or IDLE (resources are deallocated).

Figure 3:
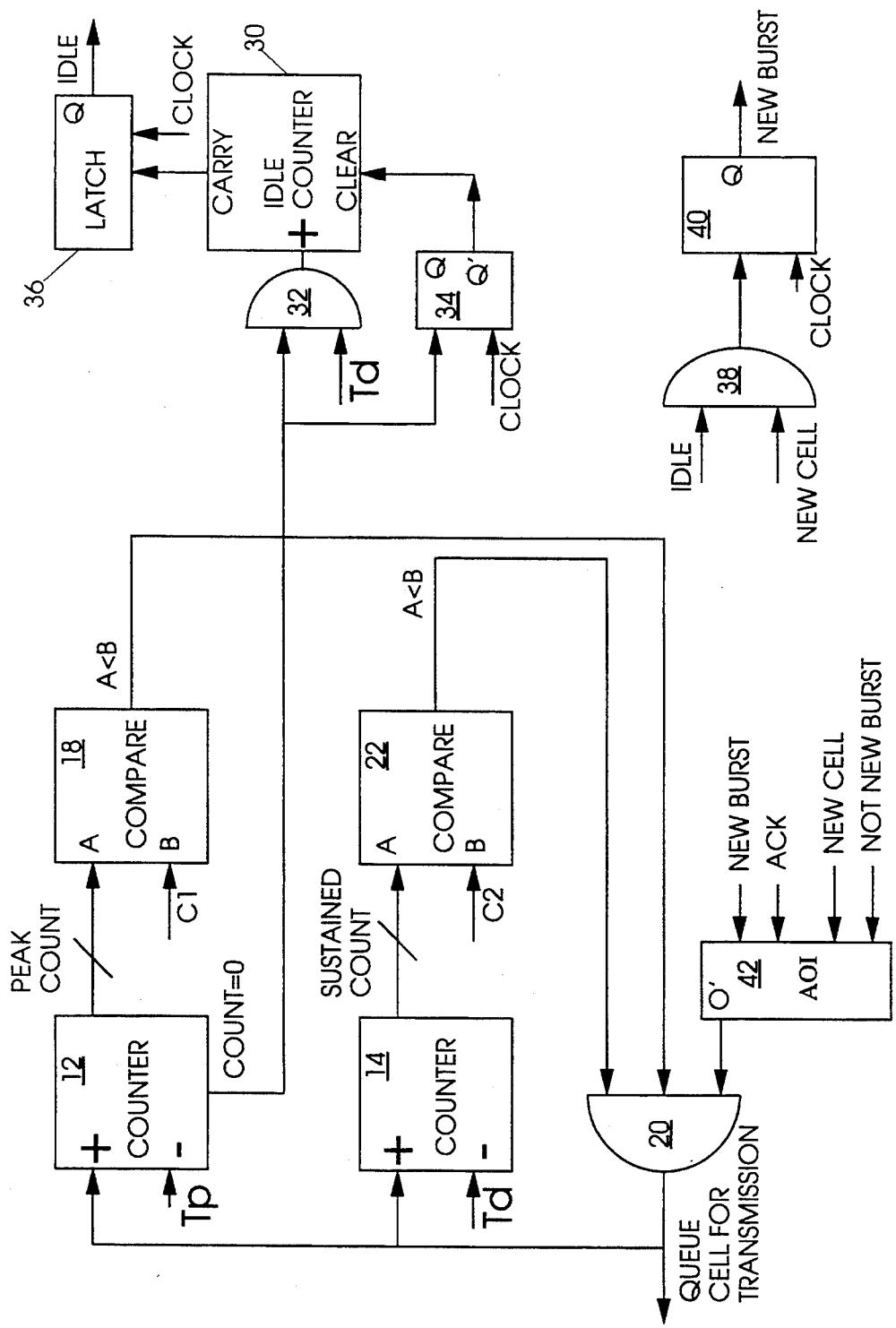
FIG. 3 is a schematic representation of preferred embodiment of a leaky bucket shaper circuit including an idle/burst detector comprising the present invention.

A VC can be in any one of three states: active compliant, active sustained and idle. In order to detect which state a VC is in, a third counter is added to the dual leaky bucket shaper circuit that is monitoring the connection. In the embodiment shown in FIG. 3, the counter 30 has a maximum count $C_{Idle}$. The counter 30 is incremented at a constant rate $R_O$. Whenever a cell arrives, the counter is cleared. However if there is no activity for a time out interval $T_O = C_O/R_O$, the counter will reach the value $C_O$. Upon the counter reaching the value $C_O$ a signal is generated indicating that the connection is inactive. The parameters $R_O$ and $C_O$ are functions of the parameters declared by the connection. The value of the time out interval $T_O$ can be dynamically altered if necessary. The time $T_O$ is chosen to be larger than the reciprocal of the sustained rate $\lambda_d$ but smaller than the estimated time in an IDLE state. A counter-based implementation of the leaky bucket shaper circuit with an idle state detector is shown in FIG. 3. In the embodiment shown in FIG. 3, the idle counter is incremented at the drain-rate time constant $T_d$ so long as the peak rate counter 12 is zero. Whenever the peak rate counter is non-zero, the idle counter 30 is cleared. The count from counter 12 is provided as a first input to AND gate 32 and to flip flop 34. The drain rate time constant pulses $T_d$ are provided as a second input to AND gate 32. A clock signal is provided as a second input to flip flop 34. The output of AND gate 32 is provided as an input idle to counter 30. The output of flip flop counter 34 is used to clear idle counter 30. A latch 36 receives as its first input the carry output from idle counter 30 and receives as its second input the clock pulses. The output signal from latch 36 is indicative of whether the associated VC being encountered is in its ACTIVE or IDLE states.

The output signal from latch 36 is provided as a first input to AND gate 38. The other input to AND gate 38 is the new cell (burst) signal. Upon the simultaneous occurrence of the idle signal and the burst signal, an output signal is routed from AND gate 38 to flip flop 40. The clock pulse is provided as a second input to flip flop 40. An output signal from flip flop 40 indicates receipt of a new burst. The described embodiment assumes the receipt of an ACK signal prior to the cell being queued for transmission of a new burst by means of AOI 42. The inputs to AOI 42 are new burst signal, not new burst signal, new cell signal and the ACK signal. The output of AOI 42 is provided as the third input to AND gate 20 and is indicative to the transmission of a new burst.

As can be seen, the additional complexity required in FIG. 3 to the prior art counter-based implementation shown in FIG. 1, is minimal.

Having described a preferred burst level control embodiment of the invention, it will be apparent are several alternative control mechanisms are possible. In a first alternative arrangement, once a connection is declared inactive the CPE is informed and the resources are deallocated. The state of the VC at the CPE and the switch will be marked as IDLE. (The CPE cart also accomplish the same results by using a value $C^*_O$ that is slightly smaller than $C_O$. That is, the CPE will detect the connection to be inactive before the switch does) then, the CPE subsequently detects activity (i.e., the beginning of a new burst while in the IDLE state), the CPE withholds the burst and asks the switch to activate the connection first through an ACTIVATE connection request. The CPE can ask for the same last set of UPC parameters that was used previously, or the CPE can ask for a new set of UPC parameters. If the CPE transmits without restoring the connection to an ACTIVE state, the transmitted data will be treated as violating traffic by the switch. The switch is able to achieve the connection since its leaky bucket shaper circuit parameters would have already been modified. When the switch receives the ACTIVATE request, the request is queued in the appropriate RRQ of the associated output port. The request is serviced when resources become available (until then the VC is blocked and maintained in a wait state). When a transition occurs from an IDLE state to an ACTIVE state, no NACK signal is sent if the VC is blocked. Once the resources become available, an ACKTOSEND signal is sent to the CPE and the CPE begins transmission of the burst., If the VC is blocked for a time greater than $T_W$, the switch returns an ACK signal with a set of leaky bucket parameters that offers a smaller bandwidth. The advantage of this implementation is that no bursts are lost. It also provides time for the switch to process the burst request. The disadvantage of this implementation is the additional signalling required, and the possible incompatibility with interfaces that do not implement the required additional signalling (ACTIVATE and ACKTOSEND) signals.

In a second alternative arrangement, when a CPE has information to transmit, it transmits at the rate determined by the current leaky bucket shaper circuit setting. This is done without an ACTIVATE signal. If the VC has been declared as being IDLE, the switch detects the transition, and makes a decision in real time whether the burst can be accepted, or not, without incurring cell loss. If the burst can be accepted, the burst is admitted. If not, the burst is rejected. If the burst is rejected, it has to be retransmitted. An ACCEPT or REJECT-SENDAGAIN signal is sent to the CPE, indicating whether the burst has been accepted or not. The CPE interface will store the burst until the ACCEPT signal is received. The switch can request a new set of leaky bucket shaper circuit parameters for the CPE to transmit the burst again through the REJECT-SENDAGAIN signal. With the changed parameters the burst will be accepted. The REJECT-SENDAGAIN signal can be delayed by the switch. In this arrangement, the retransmission is done at the media-access level, at the cost of additional signalling. However, the method has the advantages of being compatible with conventional CPE interface cards that do not have extensive signalling capability and also that if the additional signalling is not implemented, the burst will be lost and will have to be retransmitted by a higher level protocol. A limitation of the method is that the time to process the acceptance of a new burst is very short (one cell time). One method to overcome the disadvantage is to buffer n cells of the burst, where n cell times are sufficient to process the burst. This can be implemented by using either a shift register or a circular RAM-based buffer.

The primary objectives of a resource management scheme are (1) to minimize signalling overhead. In conventional connection oriented communication, call setup involves negotiation of parameter values. In the local ATM LAN environment it is desirable to avoid such negotiations, and thereby keep the signalling overhead low. The signalling overhead is the processing power required to do the fast call setup, fast resource allocation and deallocation. Since the turn around time should to be small, these functions may have to be implemented in hardware/firmware and hence are preferably kept simple. Ultimately, it will be a trade-off between implementation complexity and efficient utilization of network resources and consequent frame loss rate. (2) When the network is lightly loaded, any user should be able to capture the full capacity of the path. When the network is heavily loaded, the path capacity must be shared between all contending users. Such an approach will make the LAN appear like a shared medium. This has to be achieved with little or no frame loss. (3) To efficiently utilize switch capacity and have low latency.

In accordance with the teachings of the present invention, a general resource allocation method based on a dual leaky bucket shaper circuit will be described. The method is applicable to both connection oriented and connection-less services. The connection oriented service is a special case of connection-less service as far as resource allocation and deallocation are concerned. The following embodiments relate to resource allocation methods and apparatus that facilitate hardware embodiments.

A dual leaky bucket shaper circuit is used to monitor two traffic parameters, namely the peak cell rate, and the maximum sustained burst size at the peak rates. The dual leaky bucket shaper circuit, has four parameters $C_1$ and $C_2$, the peak and the sustained rate bucket sizes, and $\lambda_p$ and $\lambda_D$, the peak and the sustained rate. Assume that the value of the peak cell rate counter is set equal to $C_1 = 1$. This would be the case when there is no jitter in the peak rate. Given the four parameters, there is a maximum compliant burst size. That is, for a given peak rate, and sustained rate, there is a maximum burst size that one can transmit without being shaped by the leaky bucket shaper circuit shown in FIG. 1. The maximum compliant burst size $B_C$ is given by:

$$B_C = \frac{(C_2 - 1)}{(1 - \lambda_D/\lambda_p)} + 1$$

For a given set of leaky bucket parameters, the maximum burst size that can be transmitted at the peak rate $\lambda_p$ is $B_C$. If the actual burst size is larger than $B_C$, then the first $B_C$ cells are transmitted at the peak rate $\lambda_D \leq \lambda_p$ (see FIG. 2). Once a burst equal to the compliant burst size is transmitted at the peak rate, in order to transmit another burst of the same size at the peak rate, it is necessary to wait a time $C_2/\lambda_D$ for the counter value of the second bucket to decrement to zero. Hence, the dual leaky bucket shaper circuit which is rule-based makes the traffic more predictable, once the parameters are determined. For a given set of leaky bucket parameters, it becomes easy to determine the worst-case output from the corresponding source. If the worst-case output is known, call admission and burst admission can now be controlled to give zero frame loss probability. Alternatively, it is also possible to permit loss with a very small probability. The required probability values for the worst case source traffic model shaped by the leaky bucket shaper circuits can be easily determined.

In a preferred resource allocation method, when a new connection is to be established, or when a VC makes a transition from an IDLE state to an ACTIVE state, the resource requirements are determined by means of the parameters (B, $\lambda_p$, $\lambda_D$), where B is the compliant burst length. It is assumed that a peak rate bucket size $C_1 = 1$ (however, if cell delay variations are to be accounted for then $C_1$ can be greater than 1). If the switch cannot accept the connection based on the parameter values, then the call or burst can either be blocked or there can be a renegotiation of parameters between the source and the switch.

When there is either a request for a NEW connection or a VC makes a transition from an IDLE state an ACTIVE state, and the VC's resource requirements be defined by the parameters B*, $\lambda^*_p$, $\lambda^*_D$. The switch first identifies the appropriate output port and its associated resource request queue (RRQ). Each of these VCs can belong to different source destination pair. Assume that the amount of buffering in the output port is $B_Q$ and the output port speed is $\lambda_C$. Let the $i^{th}$ active VC have the traffic descriptors $B^i$, $\lambda_p^i$, $\lambda_D^i$.

The $B^i$ is the compliant burst length at the second leaky bucket, then the leaky bucket counter value $Cl_2^i$ is given by:

$$C_2^i = (B^i - 1)(1 - \lambda_D^i/\lambda_p^i) = 1$$

For a given size of the second bucket $C_2^i$, the compliant burst length depends on the choice of the peak rate and the sustained rate.

The following analysis are based on the following assumptions: the number of buffers in the switch is small, thereby placing an upper limit on the compliant burst size, and hence the size of the second leaky bucket counter. The size of the peak rate bucket counter is 1. If a source has a burst length that is larger than the compliant burst length for a given peak and sustained rate, after the compliant burst is admitted at the peak rate, the remaining portion of the burst will only be admitted at the sustained rate. That is, traffic shaping occurs only when the burst length is larger than the compliant burst length. If the source traffic is shaped, then that the burst will be held back in the CPE.

Let $\lambda_{CBR}$ be the capacity allocated to continuous bit rate (CBR) traffic on a link. Such allocation can be connection oriented service. In this case the traffic parameters will be (1, $\lambda_p$, $\lambda_p$). That is, the burst size is 1, and the peak rate and the sustained rate are the same. In a first case, the resource allocation method is such that no cell loss occurs.

The following rules are applied in order to determine if the queue can accept the new VC without incurring cell loss.

$$\text{If} \lambda_{P^*} + \sum_{i=1}^{i=N} \lambda_{P}^i + \lambda_{CBR} < \lambda_C$$

the queue can accept the traffic from the new VC.

2. Else if $$\lambda_{P^*} + \sum_{i=1}^{i=N} \lambda_{P}^i + \lambda_{CBR} \leq \lambda_C.$$

Assume that all sources have bursts to transmit that are larger than their compliant burst sizes. In this case, at steady state, all sources will be forced to transmit at their sustained rate after the initial transient. For no cells to be lost during this steady state the requirement is:

$$\lambda_{D^*} + \sum_{i=1}^{i=N} \lambda_{D}^i + \lambda_{CBR} < \lambda_C$$

However, during the transient interval, when sources are transmitting at the peak rate, cells can still be lost due to buffer overflow. In the worst case all the active sources are transmitting their bursts at the peak rate. For no cells to be lost, it is required that during a time interval $T_Q$ (that is equal to the amount of buffering in the queue), the number of bits arriving from all the active VCs must be less than the number of bits that can be transmitted by the queue it during the same interval. Define $$T_Q = \frac{B_Q}{\lambda_C}$$

For i = *, 1, 2, ..., N $$X^i = \text{Min}\left[ B_C^i + \left[ T_Q - \frac{B_C^i}{\lambda_p^i} \right]^+ \lambda_D^i, \lambda_p^i T_Q \right],$$

Then the new VC can be accepted without any cell loss at the output port queue if:

$$X^* + \sum_{i=i}^{i=N} X^i + X_{CBR} \leq B_Q.$$

If this condition is satisfied, the VC connection is setup and the leaky bucket parameters are updated. The incoming and outgoing VCs are also marked as BUSY and the connection is marked as ACTIVE.

If the above conditions are not satisfied the VC is blocked: in which case several alternatives are possible. First, ask the connection to try again. Second, put the request in the output queue and check each time resources are deallocated due to a disconnection or a connection going idle. Third, attempt to determine a new set of traffic parameters that is acceptable. For example:
Set 1. $\lambda_D^{NEW} = \text{Min}\left[\lambda_D^*, \lambda_C - \left(\sum_{i=1}^{i=N} \lambda_D^i = \lambda CBR\right)\right],$ 2. $B^{NEW} = B_Q - \left[X^* + \sum_{i=1}^{i=N} X_i + X_{CBR}\right]$ and $\lambda_p^{NEW} = \frac{T_Q}{B^{NEW}}.$ In a more optimistic resource allocation method, each VC can be in one of three states; ACTIVE, IDLE, ACTIVE and Being TIMED OUT. If the VC is ACTIVE, it can be in the compliant mode, in the sustained mode, or be waiting to be timed out. In the conservative approach it was assumed that all active VCs are in the compliant node.

In the present embodiment, all VCs that are ACTIVE and in the compliant mode are determined. Let the total number of ACTIVE VCs be N, of which L are in the compliant mode. The remaining (N-L) VCs are either in the sustained ,node or waiting to be timed out. The instant a new request arrives with parameters ($B^*$, $\lambda^*_p$, $\lambda^*_D$) for VCs i(i=1, 2, ..., L), let $$X^{i-} = \min\left[B^{i-} + \left(T_Q - \frac{B^{i-}}{\lambda_p^i}\right)^+ \lambda_D^i, \lambda_p^i T_Q\right],$$

where $B^{i-} \leq B^i$ is the residual or remaining number of cells in the burst yet to be transmitted.

Figure 4:
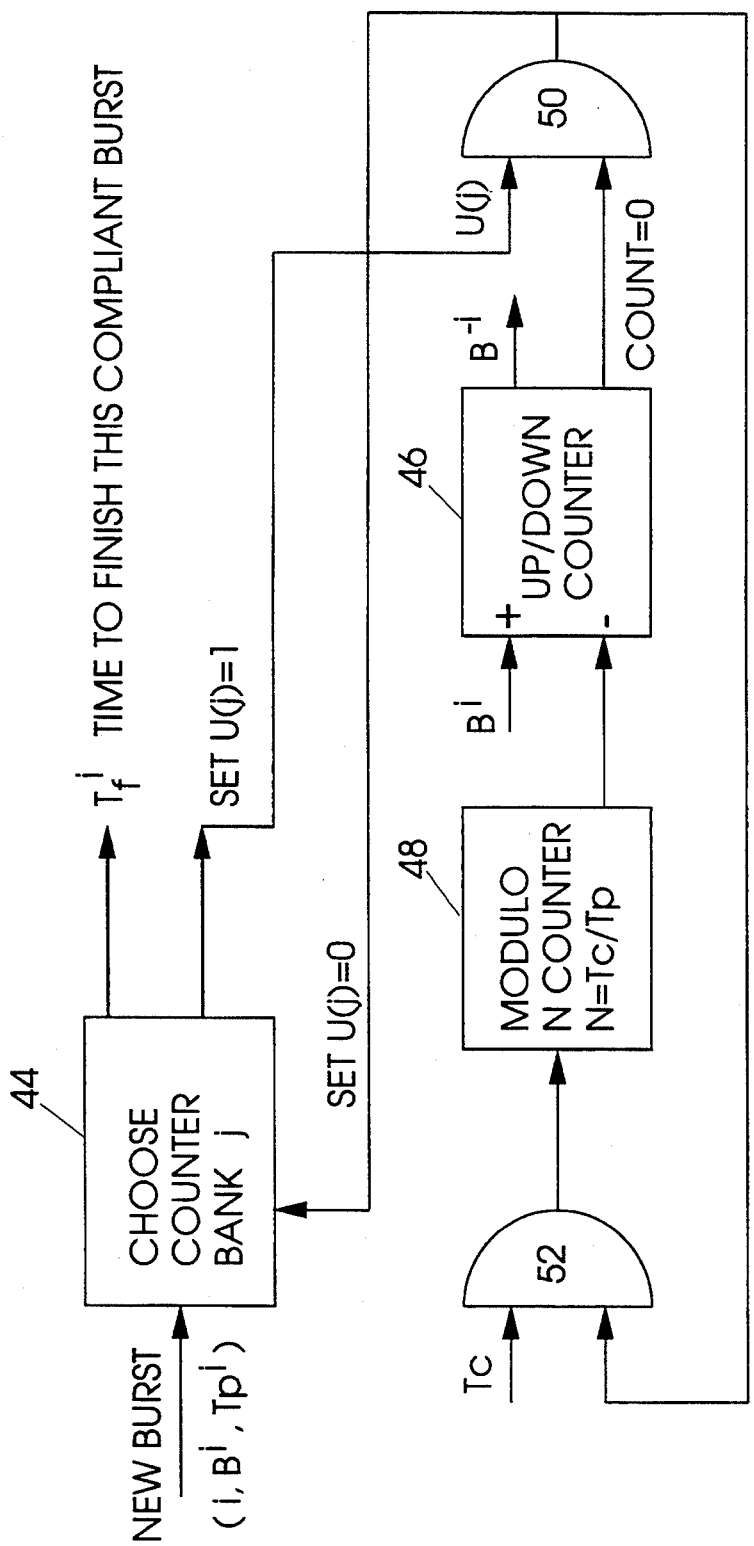
FIG. 4 is a schematic representation of a circuit for computing residual cells in the burst yet to be transmitted.

An estimator for $B^{-i}$ is shown schematically in FIG. 4. Any time a new request is accepted with values ($B_{max}$, $T_p^i$), a counter bank j 44 shown in FIG. 3 is chosen from an unused set. The relevant address for that counter bank is marked as being used. $B_{max}^i$ is loaded into the up-down counter 46 which is decremented every $T_p^i$ using a modulo-N counter until the value of the up-down counter 46 is zero, at which time the counter bank is cleared and its address is sent back to the unused token pool. The output count from up/-down counter 46 is connected to one input of AND gate 50. The other input to AND gate 50 is connected to an output of chosen counter bank j 44 and is a logic level 1 state when the VC is chosen. Thus, when up/down counter 46 reaches zero, the output of AND gate 50 is in a logic level 1 state. The output of AND gate 50 is provided as an input to AND gate 52. The other input to AND gate 52 are the pulses at rate $T_C$. The value of the up-down counter at any given time is an estimate of $B^{-i}$. The VCs L+1, L=2, ..., N are either in the sustained mode or are being timed out.

Let $P^i$ be the probability that source i that is being timed out will switch to a compliant mode (and generate a burst) before the time out expires. The computation of $P^i$ is given below.

Let $$Y^i = P^i X^i + (1-p^i)T_Q \lambda_D^i$$

The above expression gives the average contribution from sources that are not in the compliant mode.

A new request from a new connection or a VC making a transition from an IDLE to ACTIVE state is accepted if $$X^* = \sum_{i=1}^{i=L} X^{i-} + \sum_{i=L+1}^{i=N} Y^i < B_Q$$

The above implementation is considered to be optimistic, since it only takes the average contribution from those sources that are not in the compliant mode. Cell loss can result in this implementation.

In a further alternative method the probability is determined that cell loss can result if a new burst is accepted. The burst is accepted only if the probability is less than a specified value $\epsilon$. If $\epsilon=0$, the result is in the conservative arrangement described above. If $\epsilon=1$ the result is a scheme that employs no control.

The key to the present method is the ability to determine the probability that a source that is being timed-out as IDLE will become active before the timeout expires. The leaky bucket parameters of a source are ($B_C$, $\lambda_p$, $\lambda_D$). Assume that the source makes transitions between an ON state and an OFF state. While in the ON state, the source is transmitting cells. While in the OFF state, it transmits no cells. If this latter state persists for a sufficiently long length of time, the source can be timed-out.

Assume the duration of the OFF time is exponentially distributed with mean value;

$$T_{ON} = \frac{B_C}{\lambda_p} \text{ and } T_{OFF} = \frac{B_C}{\lambda_D} - \frac{B_C}{\lambda_P}$$

It is assumed that the sustained rate is equal to the, average rate. The timeout interval is $T_{OUT}$ The time out interval must be chosen such that the probability of a burst being timed out before the end of the burst is very low. The timeout interval is selected to be $T_{OUT} = \text{Max}[M\lambda^{D-1}, T^*]$ where M > 1 and for example, $T^* = 1$ millisecond.

Then the probability that source i becomes active before its time expires is given by $$P_i = 1 - e^{-A} \text{ where } A = \frac{T_{OUT}^i}{T_{OFF}^i}$$

The total number of ACTIVE VCs is N, of which L are in the compliant mode. The remaining (N-L) VCs are either in the sustained mode or are in process of being timed out. Consider the instant when a new request arrives with parameters B*, $\lambda^*_p$, $\lambda^*_D$).

For VCs i(i=1,2, ..., L), let $$X^{i-} = \min\left[B^{i-} + \left(T_Q - \frac{B^{i-}}{\lambda_p^i}\right)^+, \lambda_p^i T_Q\right],$$

where $B^{-i} \leq B^i$ is the remaining burst length.

For VCs L+1, L+2, ..., N which are either in the sustained mode or are being timed out. In a conservative approach assume., that these VCs are being timed out.

Let each source l=L+1, ..., N, not in the compliant mode, have a random variable $K^i$ which takes one of two values:

$$K^{i-} = \text{Min}\left[B^{i-} + \left(T_Q - \frac{B^{i-}}{\lambda_p^i}\right)^+, \lambda_p^i T_Q\right],$$

Assign random variables S given by:

$$S = \sum_{i=L=1}^{i=N} K^i$$

The new connection or burst is accepted if $$P[S>Z] < \epsilon_j$$

Where P[S>Z] is the probability one can have cell loss by accepting the burst. In the present example, choose $\epsilon$ to be of order of $10^{-3}$.

When connectionless service is involved there are special cases of the method. For example, in case the CPE is unable to provide a leaky bucket shaper circuit, the ability of the UPC to detect the start of the burst can be used to emulate media access control. These methods ensure that even in the worse case, performance will never of worse than that of a shared media LAN such as FDDI.

In another special case where there is at most one active VC key output port, no use is made of any shaping mechanism but rather use is made of the concept of detecting a change of state from the idle to active mode and vice versa. This can be implemented by looking at the UPC or by looking at the adaptation layer at the CPE and signalling to the switch. The adaptation layer state machines are able to recognize the beginning of a PDU. In this method the total bandwidth of the output port is allocated to a requesting VC. The peak rate and the sustained rate are set equal to the port speed. That is, $\lambda_p = \lambda_D = \lambda_C$, and the bucket size $C_2 = 1$. In this case, any burst size will be compliant and there can only be one active VC at the output port at any time. The methods works as follows:

A path between an input/output port pair can be in one of three states: in a Free state where the output port bandwidth is not allocated to any VC; in a Busy state with a single VC using the full capacity or in a Blocked state because another path using the same output port (but from a different input port) is being used by an active VC.

When a new connection setup arises, the appropriate RRQ of the associated output port is selected and the request is put in the queue. If the output port bandwidth is free, the path is assigned to the connection and the leaky bucket rates are set equal to the port speed. The path and the output port used by the path are marked busy. Also, all other free paths that :use the same output port are marked blocked.

When a connection is released or declared inactive, first the resourcess on the path and the output port used by the connection are released. Next, the resulting possible paths that can now become unblocked (because they have the same output port in common) are determined and are unblocked or marked free. Several paths could become free. Then from the RRQ whose output port bandwidth was just released, the longest waiting customer is assigned a new path. The resource allocation on the output port is updated, and the corresponding path and VCs are marked BUSY and ACTIVE. All other free paths that share the same output port as the newly assigned path (from above) are marked as blocked. If there are no requests waiting to utilize the resources released by a connection, then all the paths that were blocked because of the unavailability of these resources are marked free.

The above method has the following advantages. The signalling is simple. There is very little negotiation involved with the CPE. The method is efficient at low loads (with low latency). This method will perform as well as an equivalent FDDI if all the inputs what to communicate to the same output. Further, the method also allows simultaneous communication to other output ports as well.

Some disadvantages of this method include the following factors:

The method presupposes that all the input ports will be transmitting at the output port speed. If this is not true, there will be waste of bandwidth. If the bursts are very long, or several burst get merged into one long burst, and the variability in response time can increase. The methods allow the input port to communicate to only one output port at any given time. Connection oriented services can block an output port for a prolonged period of time.

In an alternative arrangement, many paths share the output port capacity where each new connection or a connection making a transition from an IDLE to ACTIVE state can ask for a peak bandwidth $\lambda_p$ that is less than the port bandwidth $\lambda_C$. The leaky bucket parameters would be 1, $\lambda^*_p$, $\lambda^*_p a$, with $\lambda^*_p \leq \lambda_C$. The method involves identification of the appropriate output port for the connection request. The RRQ of the output port has the following information: (a) paths that are FREE, BUSY, BLOCKED on this output port; (b) VCs that are marked FREE, BUSY, IDLE on this port; (c) resource allocated to each of the BUSY VCs that are associated with their outpout port, and (d) the total bandwidth that has been allocated.

When a new request arrives with a request for a peak rate of $\lambda^*_p$, the controller checks whether $$\lambda_p^* \sum_{i=1} \lambda_p^j, \lambda_C$$

where the index $\lambda_p^j$, is the bandwidth allocated to ACTIVE VC j using the given output port.

If the required bandwidth allows, it is possible to offer a peak bandwidth $\lambda_{NEW} = \lambda_C - \Sigma_{i=1} \lambda_p^i$ or place the queue on wait in the resource queue, and wait for bandwidth to be freed, or ask the input port to retry later.

The above method allows simultaneous multi rate-switching, and CBR sources can now be easily accommodated. The method has minimal signalling, but can operate with a higher efficiency than the previous method.

In the first method, a connection was either assigned the full capacity if it was available, or it had to wait until the full capacity was available. The quantum size was the capacity of the port. In the second method, a connection could request any bandwidth less than or equal to output port bandwidth. In the third method, the bandwidth allocation is quantized. This later method may have the advantage of each resource management, but at the expense of some efficiency.

The advantage of this method is that at low loads (with respect to a given output port), the input ports can access whatever bandwidth they request. At higher loads, there is natural sharing of the limited bandwidth between the contending connections. The result is higher efficiency and lower variance in delay.

The most general case as discussed before is an allocation of capacity based on the three leaky bucket parameters. An input port specifies all three parameters (B, $\lambda_p$, $\lambda_D$). The input port and the controller can negotiate and redefine the leaky bucket parameters as necessary. The principle advantage of the method is that traffic negotiation will now be compatible with resource negotiation procedures for wide area networking.

The leaky bucket monitors have to monitor every active VC in a system, even in systems containing a large quantity of VCs. If these monitors are provided on a per VC basis, the resulting hardware cost can be astronomical. However, it is possible to have an efficient implementation for a large quantity of VCs. This implementation takes advantage of two factors. Namely, that given the line rate $_L\lambda_l$, the number of active virtual circuits on a given link is limited to L where $\Sigma_{i=1} \lambda_d$ is less than $\lambda_l$. This implies that if the drain rate on each VC is large, then the number of active VCs on a given link will be small. However if the drain rates are small, then the number of active VCs could be large but the rate of change of their counter states could be sufficiently slow and the method could be implemented in software, rather than hardware. The other salient feature of the leaky bucket implementation is the face that as the ratio of the peak rate to the drain rate becomes large, the maximum sustained burst effectively becomes equal to $C_2$. If this ratio approaches one, this burst size approaches infinity and we are back to allocating resources only at the peak rate.

The first factor above clearly points to the possibility of a RAM-based implementation where the states are stored in a RAM and for slow VCs the control is implemented by updating the RAM while the fact VCs can be controlled in hardware. One embodiment is to have only a limited set of LEAKY bucket monitors that will be shared by all the VCs using a given link. The state information of each VC would be sorted in a RAM and at appropriate times, state information is loaded into the LEAKY BUCKETS and updated. Here, some of the high speed VC states may always be maintained in the leaky bucket circuit, and only the low speed VC status be stored in RAM. The scheme can lead to a certain amount of blocking i.e., the leaky bucket circuitry is not available when needed. If this blocking probability is low, the effect of missing an occasional update would be inconsequential. On the other hand, the embodiment leads to significant reduction in hardware. One of the problems with this implementation is synchronizing the counters. It is possible that a number of counters may need to be updated simultaneously and keeping track of that becomes very difficult.

In a virtual clock based implementation, there is a notion of a counter keeping track of time where time is quantized to the system clock and a timestamp is used for a particular event. It is assumed that the system clock is running at a much high rate than the peak and drain rates of the individual VCs. For example, if the usual clock chip is designed to operate at a rate of 40 MHz, it is several orders of magnitude larger than the cell transfer time at the peak line rate of 155 Mb/s which is 2.8 microseconds and corresponds to about 300 KHz. The number of VCs able to be multiplexed on a chip is obviously a function of the maximum system clock rate and the line rate. A virtual clock based implementation of the leaky bucket is described in article by H. J. Chao entitled, "Design of Leaky Bucket Access Control Schemes in ATM Networks" in the 1991 IEEE International Communications Conference. The., implementation in Chao can be optimized further and instead of the 256 VCs that are described in Chao, the present invention is capable of providing support for several thousand VCs in hardware and ultimately supporting 64,000 active VCs (some in hardware and the rest through RAM-manipulations in software).

Figure 5:
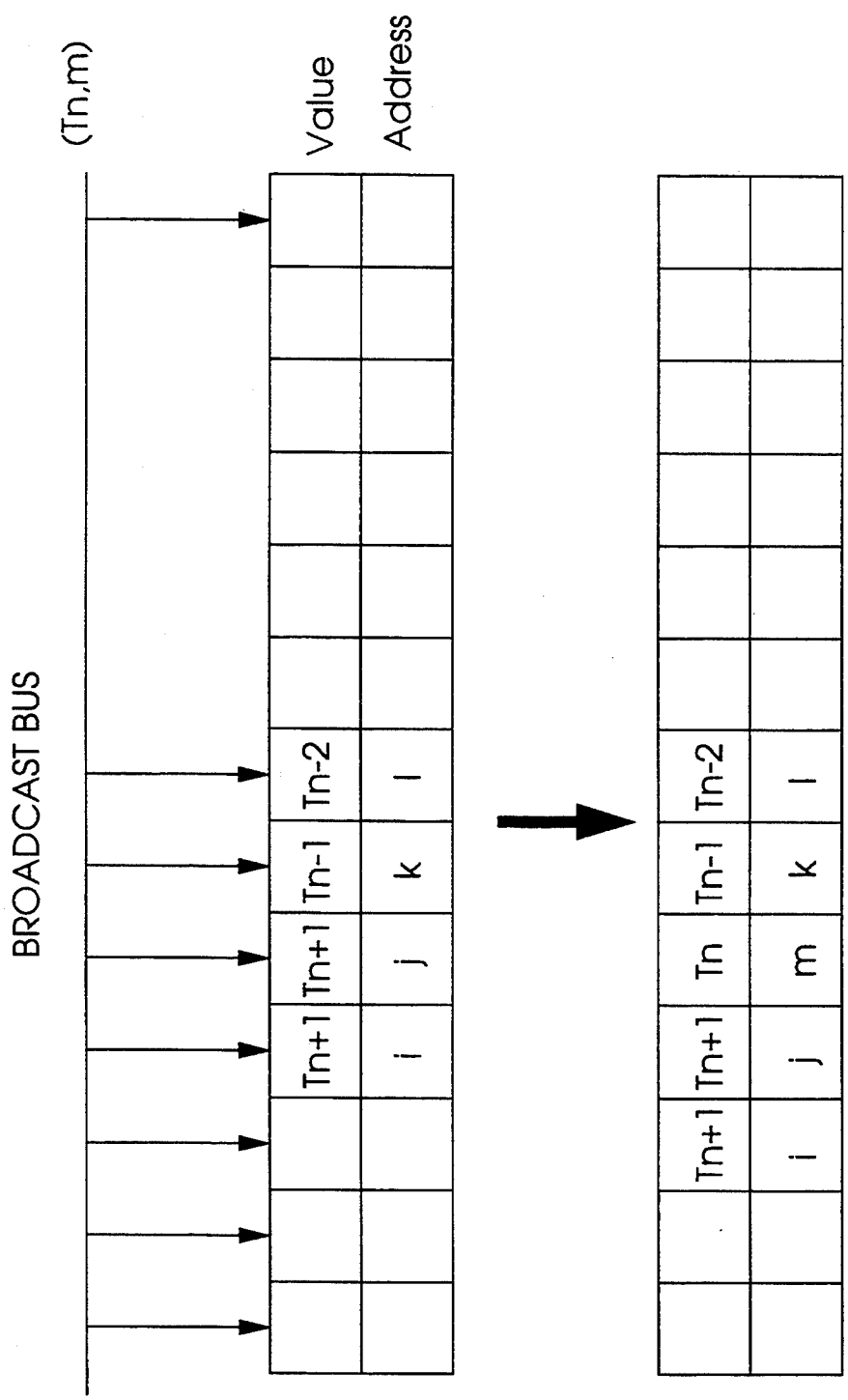
FIG. 5 schematically depicts the working of a priority queue used in a virtual clock based control implementation of the invention.

A preferred method of implementing a virtual-clock based control is the use of a priority queue. FIG. 5 schematically shows the basic working of a priority queue. A priority queue can be viewed as a chain of D Flip-Flops or shift registers connected through combinatorial logic. A broadcast bus will broadcast a 2-tuple to this priority queue, the 2-tuple consists of a value that is used for comparison (for example, a time-stamp) and an associated address or control information which is carried along with it. Once the value is received, the combinational logic (basically a compare and an and-or-invert circuit) compares the new value to the existing value. If the new value is less than the existing value, the existing 2-tuple is shifted one step to the left otherwise the existing 2-tuple is reloaded without any shifting. This creates a hole in the priority queue which gets filled. At any given clock pulse, the priority queue is either shifting right (business as usual), reloading the old value or shifting left. Thus the priority queue at any given time has an ordered list of time stamps and the entry at the head of the queue is compared to the real-time counter value $T_{now}$ to see if the time for this event has occurred or not. FIG. 5 is not the way an optimal priority queue can be implemented but is presented rather for this purpose of describing in principle. In practice, the broadcast bus is eliminated and known retiming techniques are used to make the queue essentially ripple free. The length of the priority queue has to be sufficiently large that all the active VCs are able to cycle through the RAM manipulations without falling off at the end of the queue due to faster VCs.

Figure 6:
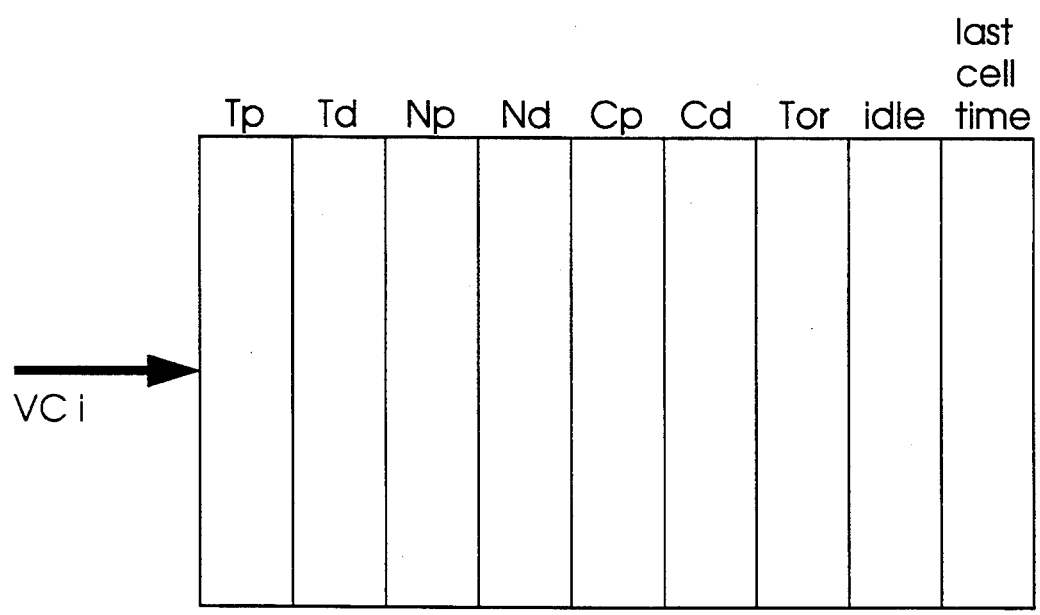
FIG. 6 is a schematic representation of a RAM implementation of a leaky bucket shaper circuit.
Figure 7:
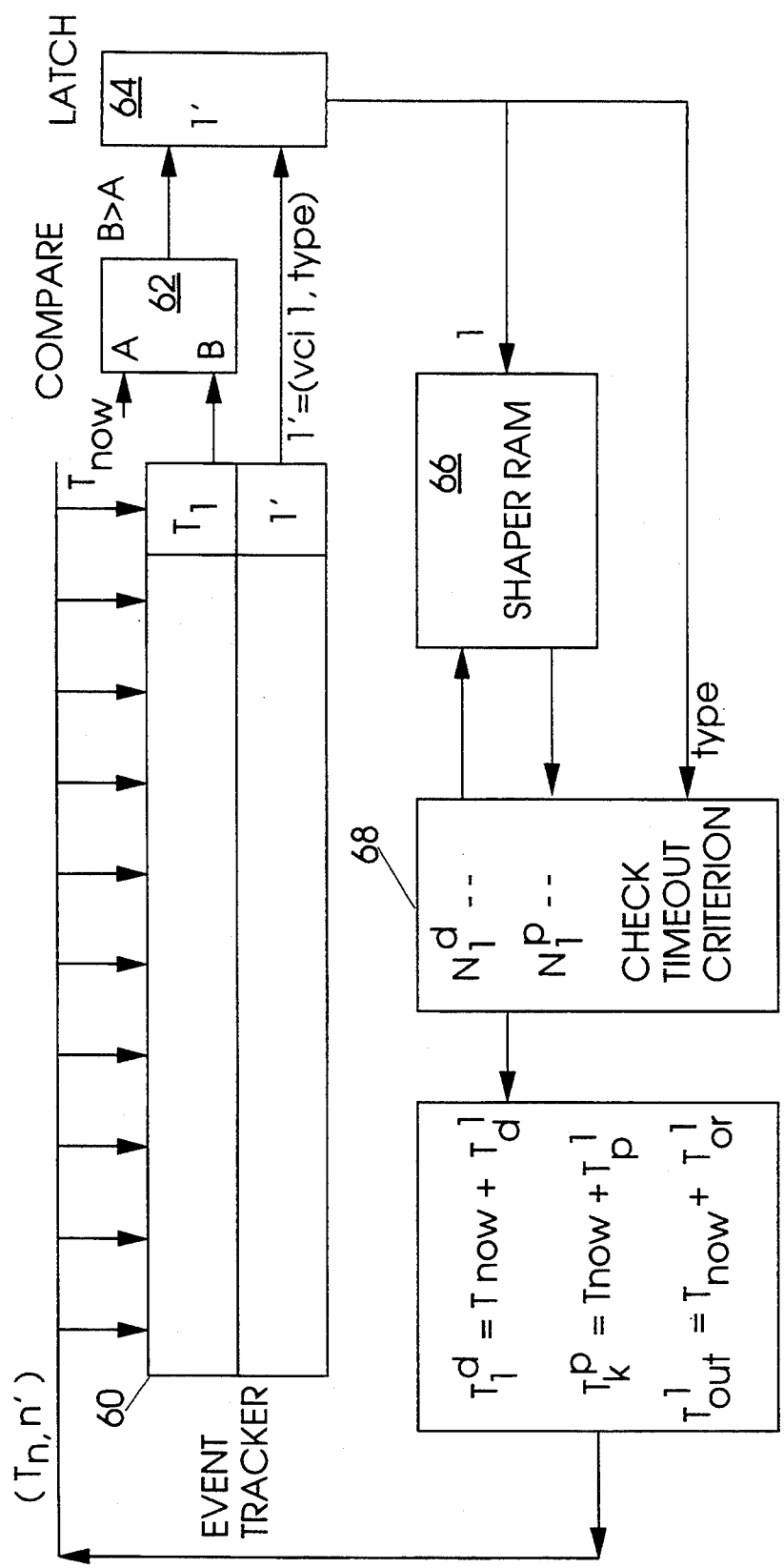
FIG. 7 is a schematic representation of a preferred embodiment of a virtual clock based implementation of the present invention.
Figure 8:
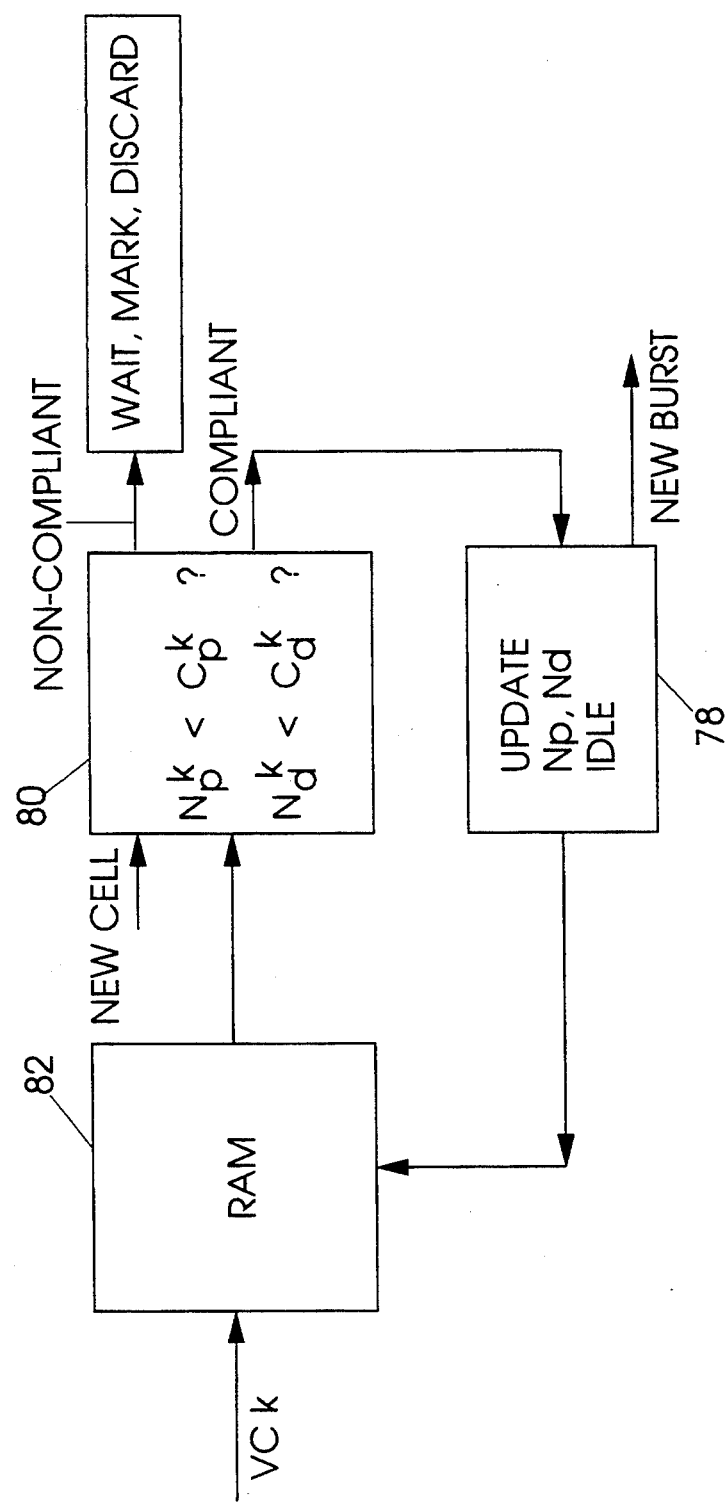
FIG. 8 is a schematic representation of a RAM implementation of a leaky bucket shaper circuit.

The leaky bucket counters and the idle/burst detectors are implemented in a RAM. The RAM is shown in FIG. 6. The RAM is indexed by the particular VC and contains fields for $T_p$, $T_d$ which are the peak and drain rate timers, $C_p$ and $C_d$ which are the leaky bucket maximum counter values for the two buckets, $N_p$ and $N_d$ which are the actual values of the counters, and $T_{or}$ which is the timeout value for this particular VC before it is declared idle (equivalent to N $T_d$ in FIG. 3). Also needed is information whether the VC is active or idle. And for time out purposes, it is necessary to know the time of arrival of the last cell. A preferred embodiment of the virtual clock based implementation is shown in FIG. 7. $T_l$ is the time-stamp for the event. The control information that the time stamp carries is the VC number 1 and the type of event (peak time-stamp, drain time-stamp and timeout time-stamp). The event at the head of the queue $T_l$ in RAM 60 is compared to $T_{now}$ in comparator 62. If the compare is true (time for the event has occurred), the control information is latched in latch 64. The address part of the information 1 is used to obtain the relevant information from the shaper RAM 66. The type field signal from latch 64 to microprocessor 68 determines the fields that will be modified. If the field to be modified is the peak $N_p^l$ is decremented by one. If $N_p^l$ is zero then it is necessary to also send a timeout time-stamp, ($T_{out}^l$ which is equal to $T'_{or}+'T_{now}$ to the priority queue. A new peak time-stamp $T^{p'}{}_l = 'T'_{now}+'T_p^l$ also has to be sent to the priority queue. If the peak counter time-stamp is much smaller then the time-out then the time-out will overtake all the time-out values for the VC (which will fall off the edge of the queue) but in order to maintain control, the time $T_{now}$ is written into the field for the last cell arrival for this VC when a request for a new cell does arrive as shown in FIG. 8. If the type of the time-stamp counter is a drain rate type, $N_d^l$ is appropriately decremented in RAM 78, the next event time calculated and sent back to the queue. If the type is timeout, then the current time is compared in RAM 80 to determine whether it actually does exceed the value of the last cell arrival by $T_{or}^l$. If it does, the circuit is determined to be idle and marked accordingly in the mode field of the RAM 72.

Whenever a new cell arrives for a given VC i, compliancy ($N_p^i < 'C_p^i$) and $N_d^i < 'C_d^i$ and if it is compliant, the relevant fields are incremented in RAM 78 as well as the current value of time $T_{new}$ into the last arrival field and queue the cell for transmission of a new burst. If the condition is not compliant, it is necessary to either wait, discard the cell or mark it as non-compliant and queue the cell for transmission. If the VC is idle and a new cell arrives, it is treated as a new burst and the new burst register is set for this VC. There is no "fly-wheel effect" on declaring a new burst, but there is such an effect on declaring idle. This is shown in FIG. 8.

Figure 9:
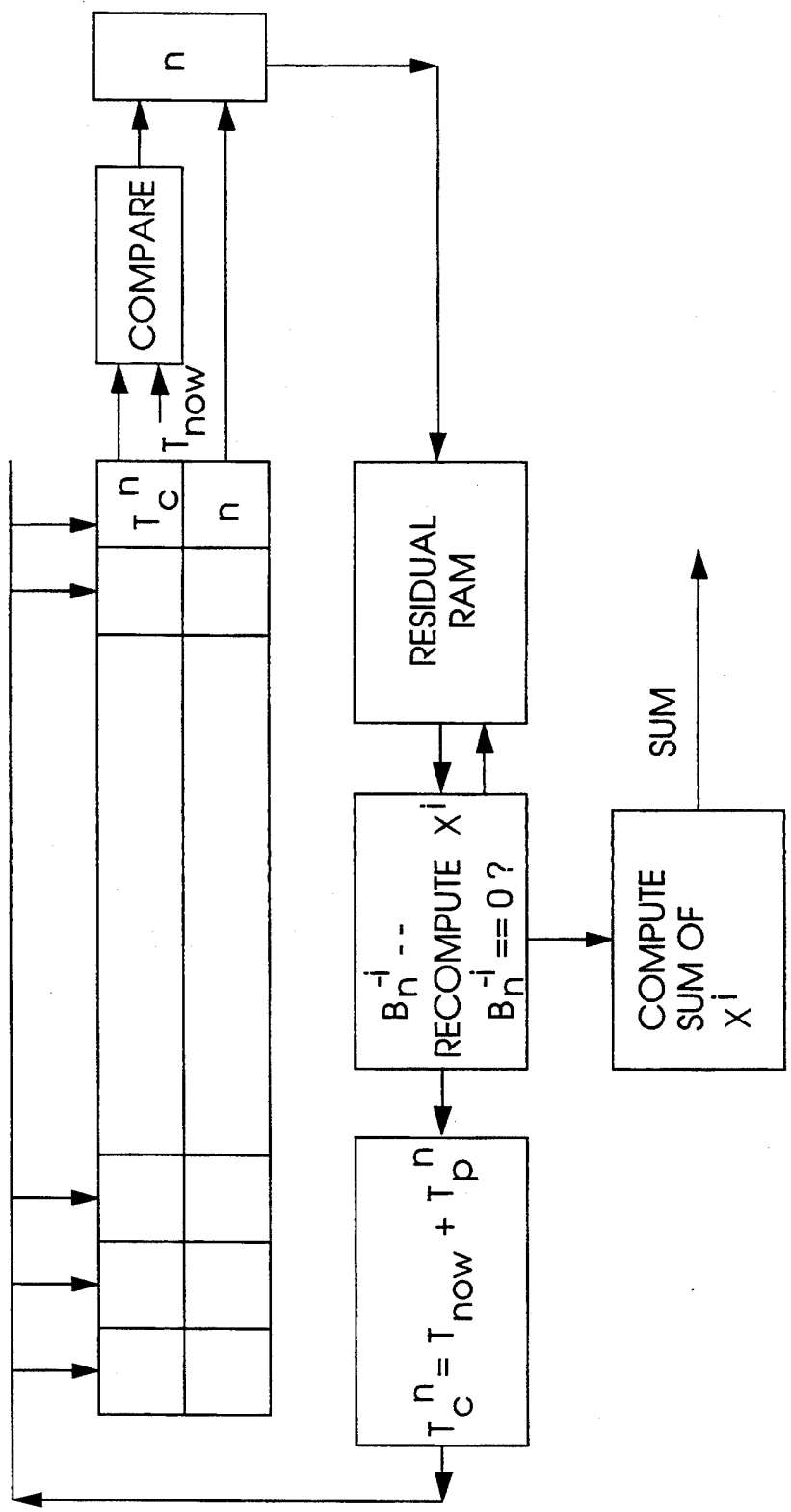
FIG. 9 is a schematic representation of a circuit used for measuring the sum of the existing compliant cells.

A similar implementation of estimating $B^{-i}$ and the sum of existing compliant cells is shown in FIG. 9. The hardware embodiment in FIG. 9 maintains track of the residual time $B_n-1$ remaining from a particular virtual channel n and in addition, computes the sum of the residual times from all of the virtual channels.

When a call is admitted, the sum of all the residual work from the existing VCs, sum $B^i$, is incremented in unit 92 by $B^i$ and $B^{-i}$ and is set to $B^i$.

At lock clock pulse $T_p^i$ both $B^{-i}$ and sum B are decremented by one. The value of $X^i$ is calculated in unit 90 from the equation:

$$X^{i-} = \min\left[ B^{i-} + \left(T_Q - \frac{B^{i-}}{\lambda_p^i}\right)^+ \lambda_D^i, \lambda_p^i T_Q \right].$$

Whenever $B^{-i}$ is zero, the corresponding VC is assumed to change from the compliant mode to the sustained mode. Resources allocations for future bursts assume that the VC will only be transmitting at the sustained rate of $1/\lambda_D$.

Figure 10:
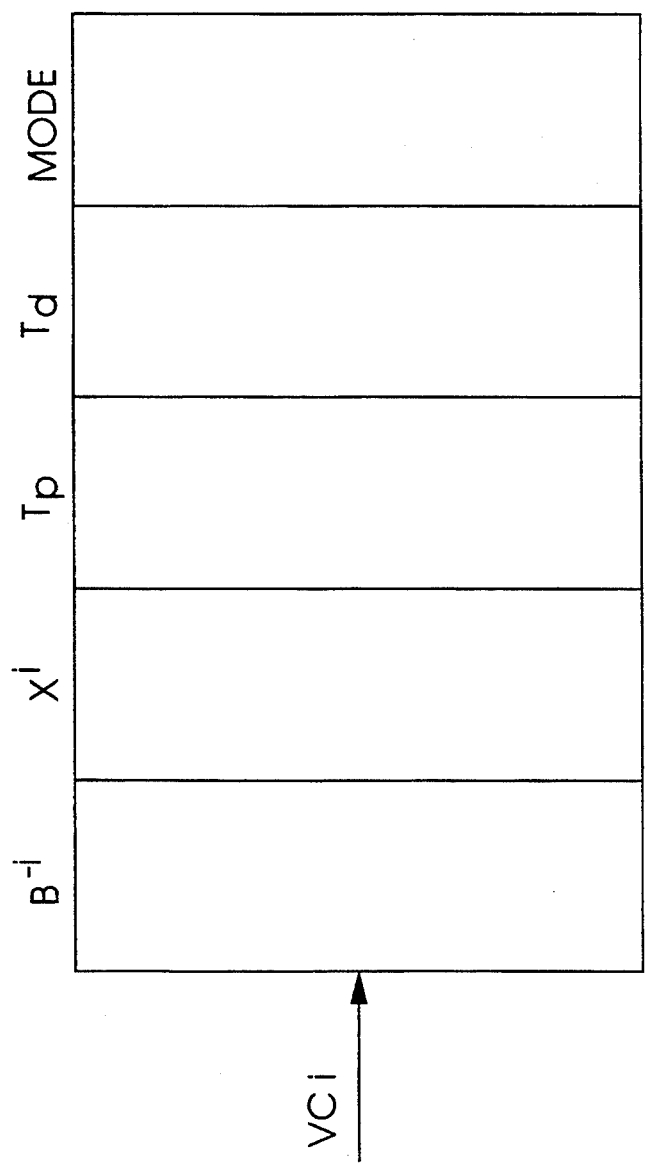
FIG. 10 is a schematic representation of the ram-based implementation of the residual RAM unit shown in FIG. 9.

A RAM-based implementation of the event in FIG. 9 and the contents of the RAM is shown in FIG. 10. This RAM keeps track of each of the VCs in the compliant mode and their residual load on the system.

A problem with the above implementation may be the size of the queue needed to ensure that it is possible to cycle through all the possible entries in the RAM in FIG. 6. One method of simplification is by maintaining a link-list of the next N events that need to be incremented or decremented in the RAM. N is chosen such that there is sufficient time to cycle through the entire VC space of the RAM. If N is much smaller than the size of the priority queue then it may be a more efficient implementation.

In a preferred embodiment, the hardware elements are replaced by memory elements. In a RAM-based embodiment, a dedicated processor, and commodity memory ICs, are used to essentially simulate the operation of the hardware illustrated in FIGS. 3 and 4. The embodiment comprises of a single processor, and some associated DRAM ICs. Even though none of the controllers is actually explicitly implemented, the "state" of each controller is saved in a preassigned location in DRAM.

Such an implementation strategy is workable, because each cell-acceptance decision depends only on the state of a single controller. Since new cell-acceptance decisions must be made at a rate typically of over 300 KHz, it is difficult to keep the states of each of the controllers constantly up-to-date. Since any new cell acceptance decision is based on the state of only a single controller, it is possible to calculate the up-to-date state of that particular controller "on demand," and thus, obtain the required correct state.

Regardless of the number of controllers being implemented, in a preferred embodiment, the counter values of each controller are always updated every 64 K maximum-rate cell transfer times. In order to update a counter value of a controller, two pieces of information are needed: the number of counter decrements that would have occurred since the last counter-value update, and the number of counter-value increments that have occurred since the last update. By fixing the amount of time between updates, it is possible to calculate the the first piece of information by knowing both the rate at which the decrements occur, and the amount of time between the time of the last update and the first decrement of the counter that would have occurred if the counter had been directly implemented in hardware; this last "decrement offset" value is subtracted from 64 K and the result is divided by the rate of the decrements. It is possible, that the decrement offset may change after each update, and hence, it is necessary to associate additional state with each counter. The number of counter value increments is kept up-to-date as cell-acceptance decisions are made, and is "zeroed" each time that the counter value is updated.

In order to facilitate the ability to make new acceptance decisions, the controllers are updated in sequence, and the updates of each controller are equally-spaced over time. With these last two facts, the up-to-date state of any particular controller can be calculated "on demand," whenever a new acceptance decision. The on-demand update is performed in the same fashion as the previously described "standard" counter-value update, except that the time since the last standard update must be computed from the current time (modulo 64 K), the controller "index", and the spacing between the updates of the different controllers.

If it is assumed that all counters have a maximum value of 256, and are decremented at a minimum rate of once every 64 K cell transfer times, two 256 K X 4-bit 60 ns DRAMs could supports as many as 4 K Leaky-Bucket controllers. The limit of 4 K is not due to memory capacity, but rather to memory bandwidth difficulties. In particular, the need to detect "idle" VCs in a timely fashion (e.g, within 5 ms of the time that would be indicated by a explicit implementation of the idle counter), it is necessary for the processor to "send" itself queries that are analogous to new acceptance decisions; each query needs to compute the up-to-date value of the "peak-count" leaky bucket, and the up-to-date value of the idle counter. The frequency at which these queries must be processed grows linearly with the number of controllers that are being implemented, and the available memory bandwidth using current technology effectively limits the number of controllers to 4 K.

A RAM-base implementation is, however, reasonably scalable. For example, if the additional cost of a custom processing IC is acceptable, 32 K of (non-trench) DRAM could be integrated onto the processor die, and a one-package, 128 leaky-bucket controller implementation could be realized. In addition, by adding more DRAMs, the described implementation should scale to 16 K Leaky-Bucket Controllers, using 8 DRAMs for Controller state.

While there has been described and illustrated a control method and architecture for ATM networks, it will be apparent to these skilled in the art that variations and modifications are possible without deviating from the broad spirit and teaching of the present invention which shall be limited solely by scope of the claims appended hereto.

What is claimed is:

1. A method of controlling a channel between a source and a destination in an ATM network, said channel having known traffic parameters of peak rate, sustained rate and compliant burst length, comprising the steps of:

shaping a burst of cells by transmitting cells up to said compliant burst length at said peak rate and then transmitting the remainder of said cells if any at said sustained rate, and controlling said channel based upon said shaped burst of cells;

where $X^i$ is a residual bandwidth requirement from source i which is computed every cell time and $$X^i = \text{Min}\left[ B_{C}^{j} + \left[ T_Q - \frac{B_{C}^{j}}{\lambda_p^{j}} \right]^{+} \lambda_D^{i}, \lambda_p^{i} T_Q \right]$$

and $$X_{CBR} = T_Q \lambda_{CBR}$$

and $$T_Q = \frac{B_Q}{\lambda_C}$$

is the time interval equal to the amount of buffering in a queue, $\lambda_{CBR}$ is the capacity allocated to continuous bit rate (CBR) traffic on a channel, when $$X^* + \sum_{i=i}^{i=N} X^I + X_{CBR} \leq B_Q$$

a new burst of cells is accepted, where $X^*$ is a new burst of cells, where $B_C^i$ is the remaining number of cells from a compliant burst of source i, $T_Q$ is a slot length, $X_{CBR}$ is a number of CBR cells arriving at the beginning of each slot, N is the number of active sources allowed to transmit, $B_Q$ is the number of buffers $\lambda_p^i$ is the peak rate of the ith source and $\lambda_D^i$ is the sustained rate of the ith source.

2. A method of controlling a channel between a source and a destination in an ATM networks, said channel having known traffic parameters of peak rate, sustained rate and compliant burst length, comprising the steps of:

shaping a burst of cells by transmitting cells up to said compliant burst length at said peak rate and then transmitting the remainder of said cells if any at said sustained rate, and controlling said channel based upon said shaped burst of cells, calculating, in an ATM network having a plurality of sources, the probability of each source providing a burst of cells having a burst length less than said compliant burst length;

assigning a probability $\epsilon$ that a cell loss can result if a burst is accepted, and said controlling said channel controlling based upon said calculated probability and said assigned probability.

3. A circuit for controlling a channel between a source and a destination in an ATM network comprising a plurality of sources., said channel having known parameters of peak rate, sustained rate and compliant burst length, comprising:

means for shaping at a source a burst of cells up to said compliant burst length at said peak rate and then transmitting remaining cells if any at said sustained rate;

means for summing residual bandwidth requirements from all sources and providing a sum value;

means for estimating a residual bandwidth remaining from said channel and updating said sum value;

means for summing said updated sum value, the bandwidth of a new burst of cells and a continuous bit rate residual bandwidth requirement for providing a summed value and when said summed value is less than or equal to the buffering associated with a destination, accepting said new burst of cells.

4. A circuit for controlling a channel between a source and a destination in an ATM network as set forth in claim 3, where said means for shaping comprises a RAM.

5. A circuit for controlling a channel between a source and a destination in an ATM network as set forth in claim 3, further comprising:

means for calculating the probability of each source providing a burst of cells having a burst length less than said compliant burst length;

means for assigning a probability $\epsilon$ that a cell loss can result if a burst is accepted, and said means for controlling said channel controlling based upon said calculated probability and said assigned probability.

* * * * *